Feb. 29, 1944.  O. S. CARLISS  2,343,000
LOAD SHARING SCALE AND BATCHING APPARATUS
Filed Jan. 27, 1940  3 Sheets-Sheet 1

INVENTOR
Oswald S. Carliss,
BY
ATTORNEY

Feb. 29, 1944.     O. S. CARLISS     2,343,000
LOAD SHARING SCALE AND BATCHING APPARATUS
Filed Jan. 27, 1940     3 Sheets-Sheet 2

INVENTOR
Oswald S. Carliss,
BY
ATTORNEY

Feb. 29, 1944.   O. S. CARLISS   2,343,000
LOAD SHARING SCALE AND BATCHING APPARATUS
Filed Jan. 27, 1940   3 Sheets-Sheet 3

INVENTOR
Oswald S. Carliss,
BY
ATTORNEY

Patented Feb. 29, 1944

2,343,000

UNITED STATES PATENT OFFICE 2,343,000

LOAD SHARING SCALE AND BATCHING APPARATUS

Oswald S. Carliss, Fairfield, Conn., assignor to The Kron Company, Bridgeport, Conn., a corporation of Connecticut Application January 27, 1940, Serial No. 315,903

18 Claims. (Cl. 249—14)

This invention relates to cooperative combinations of apparatus for accurately, expeditiously and conveniently predetermining, observing, and if desired recording, the weights of successively added batches of ingredients going to make an aggregate of materials, particularly of the heavier and more bulky kinds such as are used in the preparation of concrete mixtures, or of any mixtures of liquid and/or solid materials being more or less constantly delivered, batched and discharged as an industrial operation.

An object of the invention is, during the building up of an aggregate and upon placing cumulative components of the aggregate load successively upon a scale platform or into a weigh hopper, to know by reference to an over-and-under device exactly when enough of each component has been deposited on the scale corresponding to pre-weighted conditions of separate batcher beams, to know at all times by simple reference to an additional conventional indicating means of an automatic weighing scale what aggregate weight of material has been placed within the hopper, and to print a record of such aggregate of weight at any desired time.

Another object of the invention is to utilize as a means for knowing accurately when a predetermined weight of each component has been added to the load in the hopper, a particularly sensitive over-and-under indicator whose position is determined by the load counterbalancing effect of pre-weighted beams, each of which beams is capable of being optionally locked out of action or made cooperatively active in the load balancing system.

A further object is to utilize, as the means for causing the component weights and accumulations thereof to be indicated and recorded, a pendulum type of automatic load counterbalancing and weight indicating mechanism which may be like that disclosed in U. S. Patent No. 2,083,413, granted to Glenn E. Weist in operative association with a weight printing apparatus as disclosed in United States Patent No. 2,198,139, granted to Ernst S. Svensson, or as disclosed in United States Patent No. 2,173,746, granted to Glenn E. Weist, or United States Patent No. 2,189,802, granted to Albert Karlsson-Ygger.

A further object is so to operatively combine an automatic load-counterbalancing and weight indicating pendulum scale mechanism with a system of batcher beams, which may individually be pre-weighted and placed in or locked out of service, that the placing of a pre-weighted batcher beam in service will produce no disturbance of the automatic load counterbalancing mechanism nor interrupt the ability of its weight indicator accurately to register the weight of the load which such batcher beam becomes a factor in counterbalancing.

A further object of these improvements is to provide for separate electrical energization and control of different units or parts of the composite apparatus whereby each such unit or part may be caused to act in selective sequence and in selectively timed relationship to perform its particular function in the steps of discharging unlike materials into or out of a weigh hopper or registering and recording the component and cumulative weights thereof.

A still further object is to provide suitable electrical control means for such purpose arranged in a system of electrical connections which assures that the sequence and timed relationship in which the aforesaid different parts or units of the apparatus shall cooperatively act is predetermined, and which permits successive steps of operation to be carried through when initiated either individually or as a series by manual actuation of some remotely located switch or switches.

These and related objects will better be understood from the following description of a preferred form of the invention in which description reference is had to the accompanying drawings wherein all sectional views show parts as viewed when looking in the direction of the arrows which designate the various section planes.

The main group of parts of the entire apparatus may be referred to as the weight indicating and weight recording pendulum scale indicated as a whole by 10, the system of selectively usable batcher beams indicated as a whole by 11, and the over-and-under device indicated as a whole by 12.

Figures 1, 2, 6:
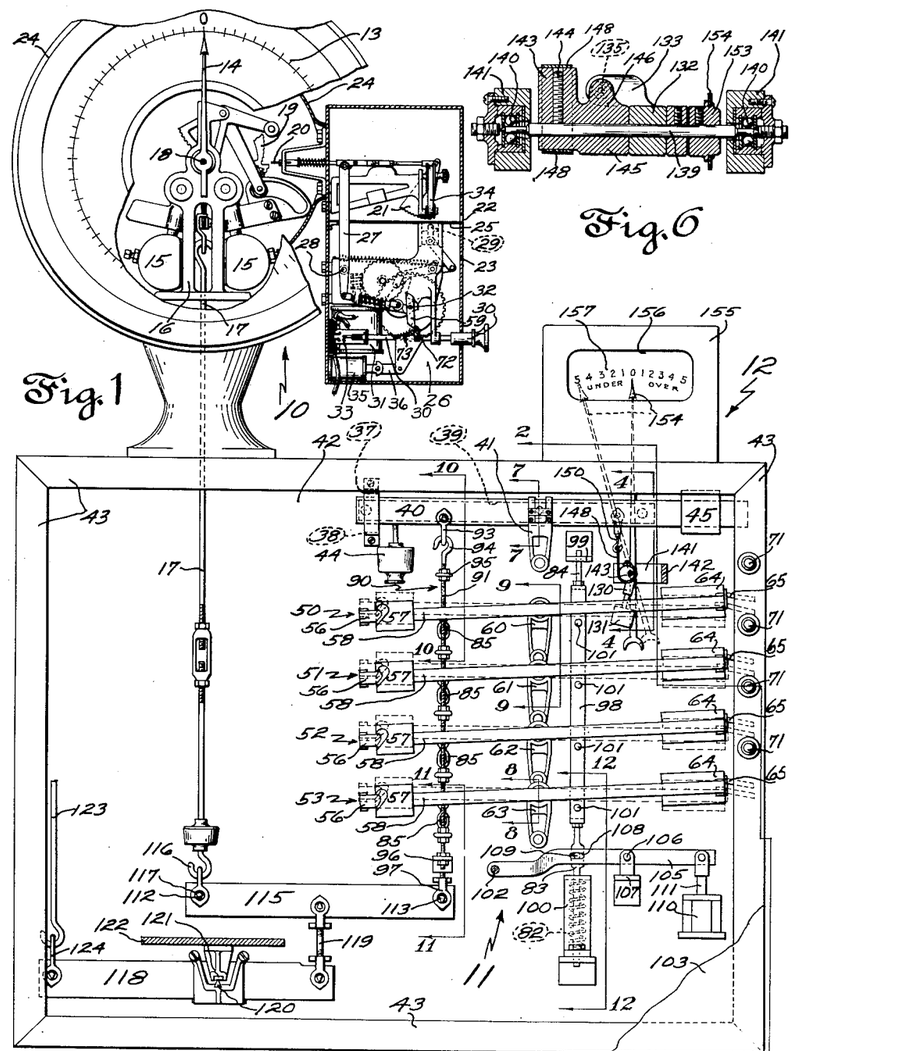
Fig. 1 is a front view of a complete apparatus assembly embodying the present improvements, including an automatic weight indicating and weight recording dial scale, a system of selectively usable batcher beams, and an over-and-under device.
Fig. 2 is a view looking from the right edgewise at Fig. 1 showing the edge cover of the batcher beam compartment partially broken away to expose interior parts which are shown partly in section on the planes 2—2—2 in Fig. 1.
Fig. 6 is a view on the same scale as Fig. 5 taken in section on the plane 6—6 in Fig. 4 showing the pivotal mounting for the pendulum.

The recording indicating scale 10 may have the usual dial 13 graduated in ordinary manner in units of weight, with the weight indicating pointer 14 sweeping over said dial in accurate response to loads of different weights, such loads being counterbalanced in part by the pendulums 15 pivoted on the frame 16 and acted upon by the down pull of suspension rod 17, all of which counterbalancing and weight indicating mechanism may be constructed and may operate as shown and described in further detail in the aforesaid U. S. Patent No. 2,083,413.

For recording or making a printed record of any weight indicated by pointer 14, the pointer spindle 18 may carry stepped discs as indicated at 19 rotatable in unison with the pointer and operative to block the path of feelers such as 20, which are slidable horizontally lengthwise toward the left in Fig. 1 and against any step presented thereto by the discs 19. Thus type-carrying segments 21 will be correspondingly swung to present some type digit in the orders of units, tens of units, hundreds of units, or thousands of units of weight toward an underlying record card or piece of paper (not shown) which may be inserted through the opening 22 in the housing 23 of the recording mechanism. Said housing 23 is rigid with housing 24 of the weight counterbalancing mechanism. Beneath a horizontal partition 25 within the case 23 is an electromechanical power cycle mechanism indicated as a whole by 26 which acts upon the feelers 20 through the medium of a vertical rocking lever 27 pivoted at 28 and which further acts upon a movable platen 29 to lift the same smartly at the proper time through an aperture in partition 25 in a manner to strike an imprint of the weight upon the record card or paper from the type of segment 21 through the medium of an inked ribbon 34 interposed therebetween.

The foregoing parts and all of their closely associated mechanisms may be as fully illustrated and described in the aforesaid Patent No. 2,198,139. Where accumulative recording is desired there may be substituted therefor the accumulative recording mechanism fully disclosed in the aforesaid Patent No. 2,173,746.

The operation of the cycle stop mechanism 26 is designed to be initiated by manually pressing the starter control rod 30 toward the left, consequent upon which the electric motor 31 through suitable gearing rotates a plurality of cams fixed to a common shaft 32 which first act to position the type segments 21, next to strike a printed record therefrom through the medium of the inked ribbon 34, and next through the instrumentality of a cycle terminating cam 59 fast on shaft 32 to move starter rod 30 toward the right thereby to open switch 33 and cut off current from motor 31 whereupon all parts become restored to their starting position ready to repeat another cycle of the weight recording action when the starter button 30 is again depressed. Magnet 35 can also close switch 33, its plunger so acting through link 36 in a manner to draw switch elements 30, 33 toward the left in Figs. 1 and 13 when its solenoid is electrically energized. 72 is a latch pivoted on rod 30 and urged toward the left to its limit position shown in Figs. 1 and 13 by the pull of spring 73 with sufficient strength to transmit the movement of cam 59 to rod 30 for opening the switch and with sufficient yielding to permit latch 72 to pass toward the left under the end of cam 59 when rod 30 is forced toward the left either manually or by the action of magnet 35 for setting the recording mechanism into action.

The system 11 of batcher beams may include a main tilting lever 40 carrying the rearwardly spaced bar 39 and fulcrumed on the stationary bracket 41 which is fixedly mounted on some rear panel 42 of the frame 43. This frame may be regarded as the main frame of the entire apparatus as it supports also the housing 24 of the weighing and recording scale. Oscillations of the main lever 40 above and below horizontal are positively limited by an upper frame carried stop 37 and a similar lower stop 38 and are dampened in usual manner by the dashpot 44, while adjustment of the balance of this lever is possible through shifting the slidable poise 45 lengthwise thereof. There may be four, or more or less, batcher beam assemblies alike each indicated respectively and as a whole at 50, 51, 52 and 53. Each batcher beam consists of a tiltable bar 54 carrying spaced forwardly from it, as by end posts 55, the poise-carrying beam member 56 along which a poise 57 is slidable in register with graduations 58, which indicate load weights which the batcher beam is capable of offsetting. Bars 54 are pivotally supported respectively on separate brackets 60, 61, 62 and 63, each of which is fixedly mounted on the frame panel 42. Each of bars 54 carries at its right end in Fig. 1 a weight box 64 and the projecting lock finger 65.

For catching and holding each lock finger 65 in its elevated position so that its batcher beam will be tilted away from the horizontal into its inoperative or full line position shown in Fig. 1, the latches 66 are provided as best shown in Fig. 2. Each latch consists of a bell crank which is swingable upon the stationary frame carried pivot 67 and is formed to provide the keeper 68 for lock finger 65 as well as the operating arm 69. The latter, when swung by the shank 70 of push button 71, swings the bell crank about pivot 67 and thereby moves its keeper 68 into and out of interceptive engagement with the lock finger 65 of the batcher beam thus enabling keeper 68 to catch and hold the lock finger in its elevated position for maintaining the batcher beam inoperative as a factor in the balance of the system. In order to limit the order of release of lock fingers 65 to a sequence in which no underlying batcher beam can be unlocked until the directly overlying batcher beam has been unlocked, each bell crank is provided also with a stop leg 76 capable of engaging a shoulder 77 on the immediately underlying latch. Each bell crank further has a horizontally extended arm 78 to which is pivoted the core or plunger 79 of an electromagnet such as 80 or 80' so that finger releasing movement of the bell crank can be effected electrically as an alternative to manually pushing button 71. Each electromagnet may be stationed rigidly on frame panel 42 by a support bracket 81.

Figures 2, 3, 4, 5, 9, 10, 11, 12:
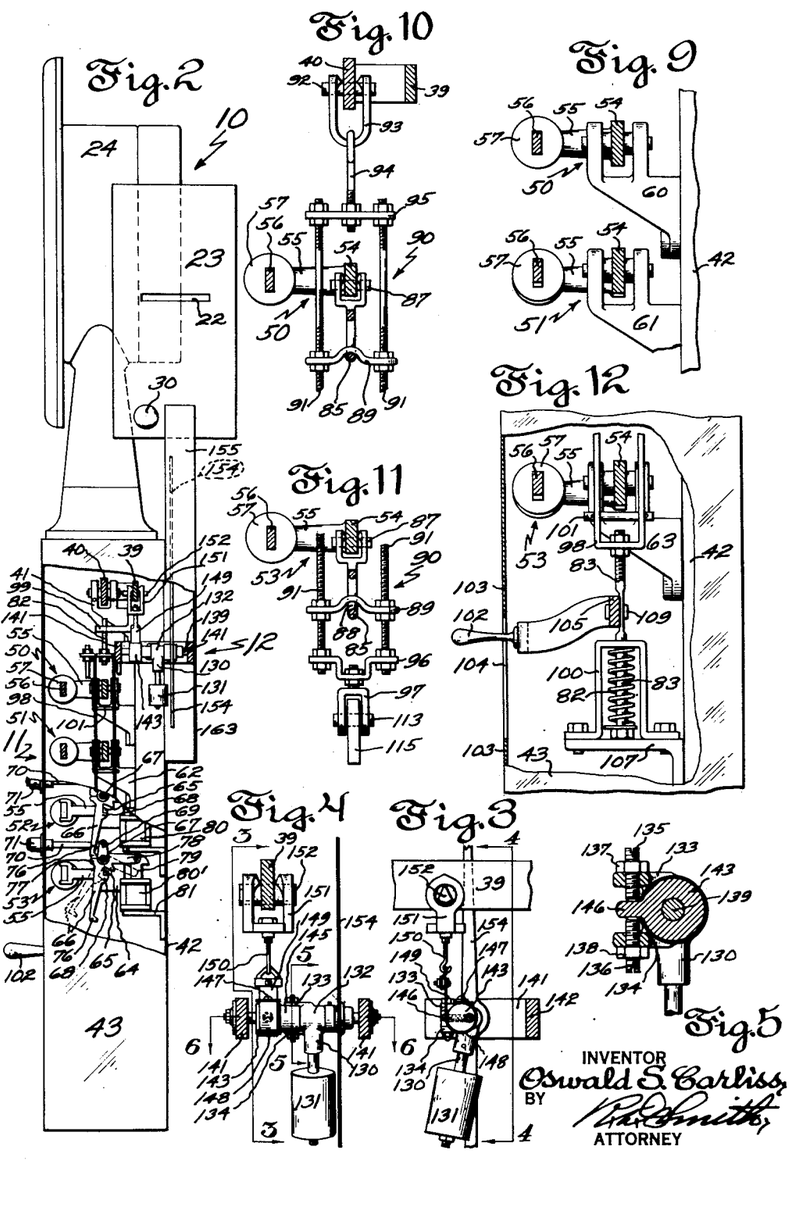
Fig. 3 is an enlarged view taken in section on the planes 3—3 in Fig. 4 showing the pendulum of the over-and-under device and parts immediately associated therewith.
Fig. 4 is a view drawn on the same scale as Fig. 3 showing the parts in section on the plane 4—4 in either of Figs. 1 or 3.
Fig. 5 is a still further enlarged fragmentary view taken in section on plane 5—5 in Fig. 4 showing means for adjusting the angular lift of the pendulum.
Fig. 9 is a correspondingly enlarged fragmentary view taken in section on plane 9—9 in Fig. 1.
Fig. 10 is a correspondingly enlarged fragmentary view taken in section on plane 10—10 in Fig. 1.
Fig. 11 is a correspondingly enlarged fragmentary view taken in section on plane 11—11 in Fig. 1.
Fig. 12 is a correspondingly enlarged fragmentary view taken partly in section on the plane 12—12 in Fig. 1, showing a portion of the batcher beam reset mechanism in relation to parts of the apparatus frame and housing.

When any batcher beam is held inoperative in its full line position in Fig. 1 by one of the latches 66, its carried shackle 85 which is pivotally suspended from knife edge 87 rigid with bar 54 is dropped sufficiently to produce the space or backlash indicated at 88 between shackle 85 and the cross saddle 89 of the suspension linkage indicated as a whole by 90. This linkage is composed of two long threaded vertical rods 91, one on either side of the bars 54 of the batcher beams, which rods at their top ends are pivotally hung from a knife edge 92 rigid on main lever 40 by means of shackle 93, hook 94 and the cross head 95 as shown in Fig. 10. At their bottom ends, as best shown in Fig. 11, rods 91 are equipped with a cross tie 96 which centrally carries a terminal yoke 97. When any batcher beam is unlocked from its latch 66 it may be so balanced that it will assume its broken line position in Fig. 1 thus closing up the space or backlash 88 shown in Fig. 11 and lifting the shackle 85 into contact with its corresponding cross saddle as shown in Fig. 10. In this way the batcher beam through the medium of suspension linkage 90 becomes a factor in the forces determining the balance or equilibrium of main lever 40.

For simultaneously resetting every released batcher beam into its locked out inoperative or full line position in Fig. 1, the reset ladder 98 is provided. The vertical movements of this ladder are suitably guided by sliding engagement of its headpost 84 with bracket 99 rigid with the frame panel 42 and by sliding engagement of its foot post 83 with bottom bracket 100 similarly rigid with frame panel 42. Rungs 101 of the reset ladder underlie the batcher beams respectively at the right side of the fulcrum brackets of the latter in Fig. 1 so that when the ladder is lifted, each rung moves up in a way to tilt its corresponding batcher beam to full line position in Fig. 1 whereupon its lock finger 65 will cam the bell crank latch 66 clockwise into its broken line position in Fig. 2 and thereby pass into locking engagement with the latch where it is retained by return of the bell crank to its full line position in Fig. 2. Against the axially expansive pressure of spring 82 the reset ladder 98 may be lifted by raising the handle 102, which as shown in Fig. 12, projects in front of the cover panel 103 through a slot 104. Handle 102 is fixed to the end of reset lever 105 which is pivotally supported at 106 on a bracket 107 fast to rear panel 42. Lever 105 may contain the elongated slot 108 engaged by the pin 109 which is fixed in the foot post 83 of the reset ladder. As an alternative to operating reset lever by means of the handle 102, the electromagnet 110 may be stationed on the main frame 43 and its core or plunger 111 pivotally connected to the right end of the reset lever as shown in Fig. 1, so that lever 105 will be tilted clockwise by the downward pull of this magnet upon its core.

According to the present improvements the suspension rod 17 and the suspension linkage 90 connect respectively to the opposite ends of a floating lever 115, the former by means of its hook 116 and the shackle 117 which pivotally engages the knife edge 112 fixed on lever 115, and the latter by means of its yoke 97 which pivotally engages the knife edge 113 fixed on lever 115. Intermediate its ends, the floating lever 115 is linked to the right end of a draft lever by the coupling 119 pivotally engaging knife edges respectively fixed on each of the said levers. Draft lever 118 carries the usual form of slidable knife edge 120 which bears upwardly against the inverted fulcrum 121 which is stationed on a cross brace 122 of the main apparatus frame 43. The draft rod 123 is representative of any form of mechanical draft connections to a weigh hopper as indicated at 125 in Fig. 13 and pulls upwardly on the left end of draft lever 118 through the medium of shackle 124 pivotally engaged with a knife edge fixed on said lever. Weigh hopper 125 has a self-closing hinged gate 125' of usual construction which may be opened by the downward pull of the core plunger of a magnet 127 when the solenoid of the latter is energized and thus discharge its load of combined materials through the bottom of hopper 125 into a truck, or to any point required for their utilization. Component materials of said combined material, such as sand and cement, may be stored respectively in bins 128 and 129 which empty their contents into weigh hopper 125 through self-closing gates 128', 129' respectively, when such gates are respectively opened by electrical energization of magnets 158 and 159 in the usual manner.

The over-and-under device appears most plainly in Figs. 1, 3, 4, 5 and 6, and is partly conventional in employing a pendulum arm 130 carrying the pendulum weight 131 and having the hub 132 provided with the spaced adjustor arms 133, 134 carrying respectively the adjustor studs 135, 136 having threaded engagement therewith and locked by nuts 137, 138. Hub 132 is free to rotate on and in relation to the shaft 139, each of whose ends is supported in a ball bearing 140 of unusual construction as shown in Fig. 6. These ball bearings are retained in bores contained in the arms 141 of a yoke shaped bearing bracket 142 as best shown in Fig. 6. Immediately adjacent to hub 132 an eccentric cam 143 is made fast to shaft 139 by the headless set screw 144. Integral with this cam is a lateral hub-like extension 145 carrying the radially projecting adjustor lug 146 disposed between the opposed ends of adjustor studs 135, 136. Wrapped around cam 143 and fastened thereto at 147 is a flexible steel ribbon 148 which at its upper free end 149 is engaged by a hook 150 suspended from the rearwardly spaced bar 39 of main lever 40 by the shackle 151 which pivotally engages the knife edge 152 fixed on said lever. At the rear of hub 132 there is made fast to shaft 139 the hub 153 of the over-and-under indicator pointer 154. Pointer 154 extends upwardly to within a protective housing 155 having the window 156 through which may be observed the movements of pointer 154 over a scale of over-and-under indicating graduations 157.

Figure 7:
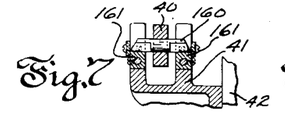
Fig. 7 is a fragmentary view taken in section on the plane 7—7 in Fig. 1 showing on a larger scale than in Fig. 1 the pivotal mounting for the main lever of the combined batcher system and over-and-under device.

A preferred construction of the fulcrum for main lever 40 is shown in Fig. 7 wherein the inverted knife edge 160 fixed in lever 40 rests pivotally on hardened blocks 161 retained on the arms of fulcrum bracket 41.

Figure 8:
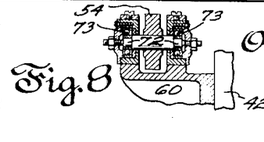
Fig. 8 is a fragmentary view on the same scale as Fig. 7 taken in section on the plane 8—8 in Fig. 1 showing the pivotal mounting for one of the levers which carries a batcher beam.

A preferred construction of the fulcrum for each of the tilting bars 54 of the batcher beams is shown in Fig. 8 wherein the trunnions 72 are fixed in the bar 54 and supported by the ball bearings 73 which may to advantage be constructed and protected as are the ball bearings proposed in the aforesaid patent to Glenn E. Weist.

Operation of the mechanical apparatus which has been described may be carried out by sequential manipulation of the various handles and controls, or if preferred, through suitable electrically connected controls and entirely automatically. In the latter case only a single manual actuation may be required to start and carry through the entire series of automatically performed steps. The operation will first be described as controlled by consecutive manipulations of the different controls. First it may be assumed that an aggregate consisting of a concrete mixture is to be batched and weighed in consecutive steps during the successive delivering to a distant hopper with which the draft rod 123 connects, of predetermined quantities of stone, sand and cement. These quantities will be predetermined in a usual manner by setting of poises 57 respectively on batcher beams 50, 51 and 52. Normally all of these beams are held in their full line positions in Fig. 1 by means of the latches 66 so that between the shackle 85 and the cross saddle 89 in the case of each beam there is present the space 88 shown in Fig. 11. Also normally the dial scale pointer 14 registers with the zero mark on dial 13 and the other parts of the weight recording dial scale 10 are positioned as shown in Fig. 1. The load of the empty hopper is exerted downwardly upon the floating lever 115 through the coupling 119, this pull of the load being resisted jointly by the scale pendulums 15 through suspension rod 17 and by the weighted lever 40 together with the over-and-under pendulum 131 through suspension linkage 90 in proportion to the distances separating the point of connection of coupling 119 on floating lever 115 from the respective points of connection thereto of the suspension rod 17 and suspension linkage 90. The parts are so balanced and arranged that when the hopper is empty, the over-and-under pointer 154, as well as the dial scale pointer 14, is poised at zero position as shown in full lines in Fig. 1.

With the poise 57 set on batcher beam 50 at the graduation designating the proper weight of the stone ingredient of a predetermined concrete mixture, and with the poise on beam 51 set for the proper weight of the sand ingredient, and the poise on beam 52 set for the proper weight of the cement ingredient, batcher beam 50 is first unlocked by pressing the top button 71 so that it is caused to tilt clockwise in Fig. 1 to its broken line position by the excess of weight in shot box 84 over the weight of poise 57. This closes up the space 88 between its shackle 85 and cross saddle 89 and exerts an upward force on suspension linkage 90 which permits weight 40' and the over-and-under pendulum 131 to tilt the main lever 40 clockwise in Fig. 1. This swings the over-and-under pointer 154 counterclockwise into its broken line position in Fig. 1. In this action of the parts the degree of tilting of lever 40 is limited by the frame stop 27. As the dial scale pendulums 15 still continue to counterbalance their same proportionate share of the weight of the empty hopper, no displacement of the pointer 14 from zero position is occasioned.

The stone ingredient is now delivered to the hopper until the increased pull of the shackle 119 downwardly on floating lever 115 restores the main lever 40 and over-and-under pointer 154 to their full line positions shown in Fig. 1. This same pull of the coupling 119 will have forced down draft rod 17 and lifted pendulums 15 until pointer 14 indicates the accurate weight of the stone ingredient on the scale dial 13. The stepped discs 19 will have become correspondingly rotated so that upon inserting a record card in slot 22 and pressing inwardly the recorder control button 30 said accurate weight of the stone ingredient will be printed on such card.

The operation above described is repeated for each of the additional ingredients of sand and cement going to make the concrete aggregate, it being understood that the delivery of the ingredient to the hopper is in each case terminated either manually or automatically when the over-and-under pointer 154 reaches zero position. Thus after each successive addition of an ingredient to the hopper, the accumulated weight of all ingredients which have been so added will at all times be indicated by the weight printing scale 10 and may be recorded thereby. If the weight is printed after each ingredient is added to the weigh hopper, a permanent record is furnished by which the accuracy of each aggregate mixture may be known before as well as after all batching operations have been completed.

Figures 13, 14, 15:
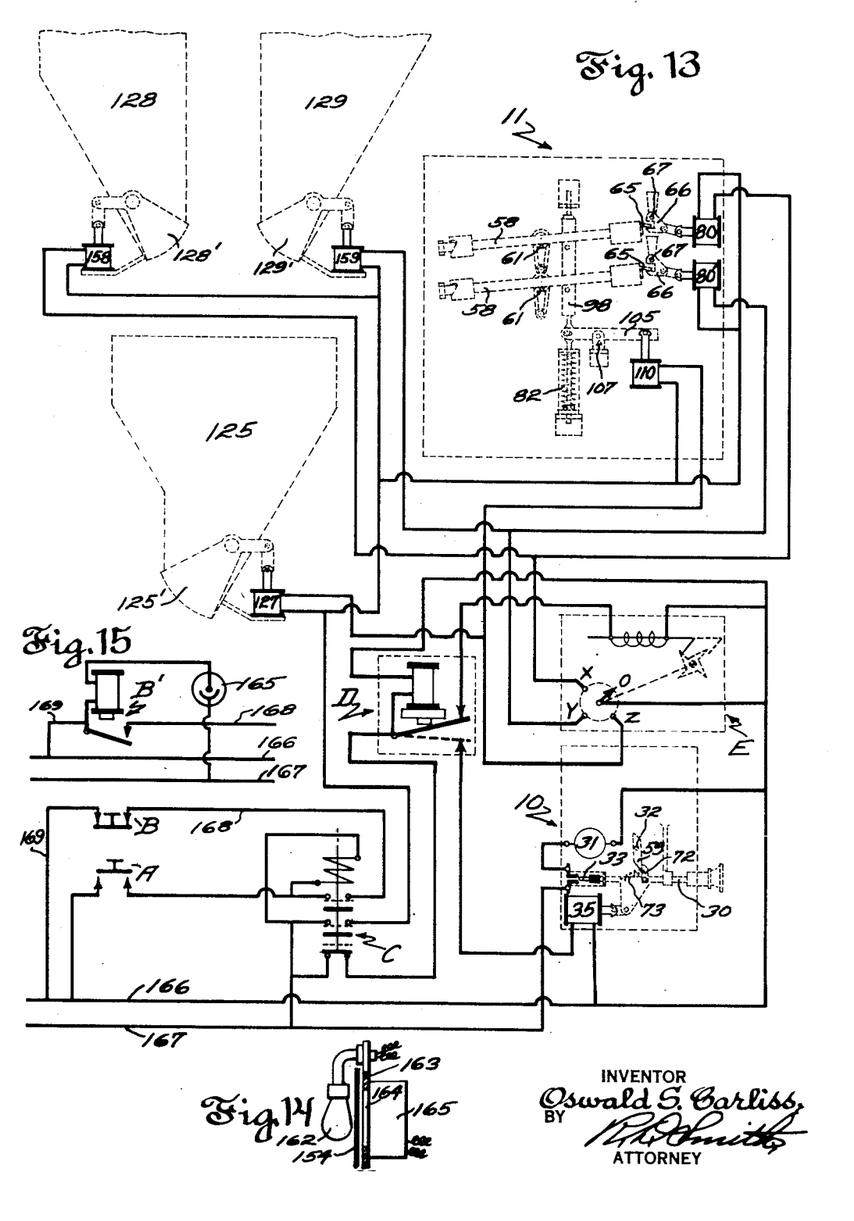
Fig. 13 shows diagrammatically a system of batching apparatus having its parts operated in coordinated relation from some remote point by electrical energization and control.
Fig. 14 shows the structure of a photo-electric circuit controller applied at the zero location of the over-and-under indicator.
Fig. 15 is a fragmentary view of a portion of the electrical system of Fig. 13 modified to incorporate the photo-electric circuit controller of Fig. 14.

For illustrating one manner in which magnets 35, 80, 80', 110, 127, 158 and 159 may be electrically energized in properly timed relation and in predetermined sequence for measuring out by weight first a load component of material such as sand, next a load component of a different material such as cement, and finally the aggregate load composed both of sand and cement, it will be assumed that a supply of sand is stored in bin 128 and a supply of cement in bin 129 in Fig. 13. "A" is a manually closable self opening momentary contact switch located at the control station at which the operator works. "B" is a manually operable self closing momentary contact switch located at the same control station and which in an automatic cut-off form of the system may be replaced by a photo-electric cell type of circuit control sensitive to light beam cut-off by the over-and-under indicator when the latter is at zero.

"C" is an electromagnetic remote control switch whose contact carrying core drops by gravity to the position shown in Fig. 13 wherein only the lowest pair of its six circuit terminals are conductively bridged, and whose said core upon energization of its solenoid is lifted to an upper or broken line position in which only the upper two pairs of its six circuit terminals are bridged. "D" is a retarded double throw relay whose electromagnetic core drops by gravity to a lower position thus swinging the circuit shifting arm to its position shown in broken lines in Fig. 13 and whose said core is lifted to its upper position shown in full lines when its solenoid becomes energized at the expiration of a predetermined interval of time following the connecting up to remote control switch C of the circuit containing the active element of the time delay device of relay D. "E" is a well understood type of sequence relay in which the four-armed star-shaped ratchet wheel is turnable step by step counterclockwise and correspondingly turns the arrow headed current distributor arm responsively to repeated reciprocative movements of a pawl normally urged toward its broken line position in Fig. 13, but pulled toward the left into its full line position by each stroke of the core plunger when its solenoid is electrically energized. "O," "X," "Y," and "Z" are circuit terminals of relay E, each of which terminals may in turn be contacted by the said arrow headed rotatable distributor arm.

With continued reference to the electrical system of Fig. 13, the operation of batching measured weights of different materials such as sand and cement, and of recording their separate as well as combined weights, may begin with the electrical and mechanical parts conditioned as shown in the diagram of Fig. 13. Gates 128' 129' and 125' are all assumed at first to be closed. Sand is contained in bin 128. Cement is contained in bin 129. Weigh hopper 125 is empty. Both batcher beams 58, 58 are locked out of their operative range of action in the load counterbalancing system as shown in Figs. 1 and 13. Current is cut off from the printer motor 31 at the switch 33. If the electrical connection between the current supply mains 166, 167 and the various points in the electrical system are arranged as diagrammed in Fig. 13, then in this illustrated condition of the system the circuit of each of magnets 127, 158, 159, 110, 80 and 80' is dead ended at remote control switch C and also at the sequence relay terminals X, Y, or Z, while the circuit of magnet 35 is dead ended at the double throw retarded relay D.

The operation is started by manually closing and momentarily holding closed the pilot switch A at the station where the recording scale, batcher beam, and over-and-under indicator are located remote from material bins 128, 129, and from the weigh hopper 125. This energizes the solenoid of C and at C dead ends the circuit containing the solenoid of D, at the same time coupling to supply main 166 the solenoid of C and coupling to main 167 (without thereby energizing them) the circuits containing magnets 127, 158, 159, 110, 80 and 81. Because the solenoid of D is thus deenergized, its circuit shifting arm will drop to broken line position thus dead ending the solenoid of sequence relay E so that its pawl is permitted to move to broken line position ready for a subsequent pulling stroke toward the left upon the star wheel. At the same time the circuit containing magnet 35 is connected up through D as far as C without becoming energized.

The momentary manual closing of pilot switch A in the nonautomatic form of the system is to be followed by momentary manual opening of pilot switch B whereupon the solenoid of C is deenergized and its movable contacts resume their lower or full line positions in Fig. 13. This will not immediately energize the solenoid of D but will set the active element of its time giving device into operation for later and automatically energizing this solenoid. Prior to this the immediate energization of magnet 35 pulls control rod 30 toward the left overcoming the tension of spring 73 upon latch 72 and closes switch 33, thus energizing the motor 31 of the electromechanical cycle-stop weight recording mechanism. Motor 31 proceeds to turn cam shaft 32 slowly counterclockwise which action in the manner described in full detail in the aforesaid Patent No. 2,198,139 causes the weight indicated by scale 10 to be printed. In this instance the weight printed will be zero since the weigh hopper 125 is empty. As cam 59 is just completing a half turn, one of its ends picks up and mechanically impels control rod 30 toward the right automatically breaking the motor circuit at 33.

Prior to this the aforesaid time giving device in D has operated to energize the solenoid of D and thereby move its circuit shifting arm to full line position thus dead ending the circuit of magnet 35 at D. Hence the pull of magnet 35 upon switch control rod 30 is discontinued before cam 59 comes into action against latch 72 for opening switch 33. The circuit shifting arm of D by moving to its said full line position also energizes the solenoid of E so that its pawl is drawn toward the left to its full line position thus rotating the star wheel and thereby the arrow headed distributor arm counterclockwise from position "O" to position "X" and placing the circuits of magnets 158 and 80 in connection with supply main 166.

The system is now conditioned, with pilot starting switch A normally open and pilot stopping switch B normally closed, so that only the solenoids of D and E are energized while the distributor arm of E is established at position X. We are now ready to begin the operations of batching, weighing and recording. These operations are carried out in a sequence predetermined by the presence of E in the electrical system as follows.

A second momentary manual closing of A will now again energize the solenoid of C which as before explained deenergizes the solenoid of D and thereby deenergizes the solenoid of E. Now, however, because the circuit of magnets 158 and 80 stand coupled to supply line 166 at X, the lifting of the contact bridging elements in C energizes magnets 80 and 158. Upper batcher beam 58 in Fig. 13 is thus released by latch 66 and thereupon becomes a factor in the counterbalancing of weigh hopper 125 and of any load placed therein. At first this causes the over-and-under indicator 154 to register "under" as hereinbefore explained. Simultaneously the discharge gate 128' of storage bin 128 is opened and sand runs out into the weigh hopper until the weight of the sand in the hopper has become sufficient to return the indicator 154 to center or zero position. This is observed by the operator who then momentarily opens pilot switch B which deenergizes the solenoid of C which deenergizes magnet 158 permitting gate 128' to close and cut off the flow of sand into the weigh hopper. There is later explained the use of a photo-electric cut off device to avoid errors due to failure of an operator accurately to synchronize the opening of pilot switch B with the arrival of pointer 154 at zero. Simultaneously this same action of C deenergizes magnet 80 freeing upper latch 66 ready for subsequent service as a device for locking out the upper batcher beam 58. When its solenoid is thus denergized, C also initiates the delayed energization of the solenoid in D which energization finally takes place before the cycle of recording station is completed, thus causing D to deenergize recorder starting magnet 35 and simultaneously energize the solenoid of E. The arrow headed distributing arm in E is thereupon advanced from position X to position Y thus dead ending at X the circuits containing magnets 158 and 80 and in their stead connecting magnets 159 and 80' to the supply main 166 through Y. An amount of sand accurately predetermined as to weight by the balancing action of the upper batcher beam in Fig. 13 has thus been discharged into the weigh hopper and a record of its weight has been printed while this same value of weight stands indicated by the scale pointer 14 on the dial 13.

It will be understood that in accordance with well known practice there may be substituted for the self closing manually opened momentary contact switch B any of the common forms of electric ray or photo-electric light beam cut off devices arranged to cause automatic opening of the circuit in which B is located whenever the over-and-under indicating pointer 154 occupies its full line or zero position in Fig. 13. This will automatically cause gate 128', or any other desired gate properly connected in the system, to close when the exact weight of material for which the poise on the corresponding batcher beam is set has been received into the weigh hopper.

As shown in Fig. 14, a photo-electric circuit controller may be applied at the zero location of the over-and-under indicating pointer 154 of Figs. 1 and 2. This may consist of a constant source of light 162 flanking one face of upright frame panel 163 which carries the over-and-under dial or graduations 157. In this modification panel 163 contains an aperture 164 at the center or zero location of pointer 154 and on the opposite side of this aperture there is mounted the photo-electric cell device 165 adapted to be acted upon by, and electrically responsive to, change in intensity of light rays projected through aperture 164 from light source 162. At zero or full line position in Fig. 1 pointer 154, or some opaque flag device or enlargement carried thereby, intervenes between light source 162 and aperture 164 cutting off the light rays which at other times are projected through the aperture to affect cell 165 whenever pointer 154 is displaced toward the left or "under" side of zero position. A somewhat corresponding use of a photo-electric cell device is set forth in greater detail in U. S. Patent No. 2,189,802 granted to Albert Karlsson-Ygger.

The electrical effect of this photo-electric cell upon the system of Fig. 13 will be clear from the fragmentary diagram in Fig. 15 wherein any suitable type of relay designated B', which is operable by changes of light intensity at photo-electric cell 165, may replace the manually operable pilot switch B. When no change is made in the system of Fig. 13 other than the substitution of B' and 165 for B, with connections as shown in Figs. 13 and 15, the before described result of the second momentary manual closing of the starting pilot switch A will be modified as follows.

First it will be understood that when pointer 154 is at zero and cuts off light to the cell 165 the solenoid of relay B' is deenergized and its controlled contacts are open. Any well known form of amplifier tube or device (not shown) may be employed to build up the naturally weak electrical effects arising in cell 165. When the operator momentarily closes self opening pilot switch A the solenoid of C will be energized as before and as in Fig. 13 will deenergize the solenoid of D and thereby deenergize the solenoid of E and energize the circuit of magnets 158 and 80. Upper batcher beam 58 is thereby released as before and swings pointer 154 toward the left away from zero admitting light to cell 165 and causing relay B' to close its contacts. At the same time sand begins to be discharged from bin 128 into weigh hopper 125. Before enough sand is thus delivered to the weigh hopper to return pointer 154 to zero, pilot switch A is manually released and reopens. But since B' contacts are closed by the absence of pointer 154 from zero, the circuit containing the solenoid of C remains energized until the increasing load of sand in hopper 125 returns pointer 154 to zero. At that time said pointer cuts off the light from cell 165 which deenergizes the solenoid of B' and permits its contacts to open. As the contacts of pilot switch A have already opened, the solenoid of C will now be deenergized which in turn, and as in Fig. 13, deenergizes magnet 158 permitting gate 128' to close and cut off the flow of sand into the weigh hopper. This automatic closing of gate 128', or of gate 129', etc., at the proper time by use of a photo-electric cell enables each entire cycle of operations for delivering a pre-measured weight of material to the weigh hopper to be automatically carried out and automatically terminated as a consequence merely of a momentary closing of pilot switch A. In more complicated and fuller automatic forms of the system, pilot switch A may be made automatically to repeat its closing at proper times thereby to carry out the complete four stage cycle of batching, recording, discharging and resetting operation consequent upon a single momentary closing of pilot switch A.

A third momentary manual closing of A followed at the proper time by momentary manual opening of B, or by the operatively equivalent opening of the circuit containing B by the above proposed photo-electric cell cut off device, will now in like manner through the action of magnets 159 and 80' cause to be delivered from storage bin 129 to weigh hopper 125 an amount of cement predetermined by the lower batcher beam 58 in Fig. 13. The weight of this amount of cement together with the amount of sand previously delivered to the weigh hopper will now stand indicated by scale pointer 14 on dial 13 and the value of such aggregate weight of the combined materials will have been duly recorded as before. As a final step in this stage of the operations, the arrow headed distributor arm of E will have been advanced from position Y to position Z thus dead ending at Y the circuits containing magnets 159 and 80' and in their stead connecting magnets 110 and 127 to the supply main 166 through Z. Any desired number of storage bins and batcher beams additional to the two shown in Fig. 13 may be added to the system and have their corresponding operating magnets arranged in circuits terminating at points in the sweep of the distributor arm of E intermediate the aforesaid circuit terminals Y and Z.

The final or fourth momentary closing of A, followed at the proper time by momentary manual opening of B, will now cause a cycle of electrical effects to take place similar to those which were caused to take place by the second or third operations of pilot switches A and B, except that in place of delivering added materials to weigh hopper 125, magnet 127 is now energized to open gate 125' and discharge all of the contents of the weigh hopper into a waiting truck or to some point of their utilization, while in place of letting into action another batcher beam, magnet 118 is energized to lift upwardly and thereby reset both batcher beams 58, 58 into their locked out positions shown in broken lines in Fig. 13. As a final step in all of this cycle of operations, the arrow headed distributor arm of E will have been advanced from position Z to position O, thus dead ending at E all circuits having terminals X, Y or Z. No turning "on" or "off" of current in the mains 166, 167 can now cause action or disturbance in the system. So normally conditioned, the system requires closing of pilot switch A to restart another cycle of load batching and weight indicating or recording operations.

Unlimited additions to and variations of the electrical controls and circuit connections herein illustrated may be introduced within the principles of these improvements, wherefore the following claims will be understood to apply to and cover all equivalents and substitutes for the particular elements and arrangements which have herein been chosen merely to illustrate a practical embodiment of the invention.

I claim:

1. Weighing and batching apparatus comprising in combination with a weighing scale including a load counterbalancing pendulum and a weight indicator, mechanism operative to record weight values indicated by said scale, an over-and-under indicating device including a load counterbalancing pendulum, a load receiver having joint draft connections both to said scale and said device, and batcher beams constructed and arranged to augment the draft of said device upon said load receiver at one time and to exert no draft upon said load receiver at another time, said device indicating zero both when said scale indicates zero and on occasions when said scale indicates different magnitudes of load weight, and said mechanism recording the value of weight indicated by said scale independently of the indications of said over-and-under device.

2. Weighing and batching apparatus as defined in claim 1 in which the said weight recording mechanism includes an electrically powered prime mover and is constructed and arranged automatically to carry through and terminate a cycle of weight printing performance each time said cycle is initiated, together with an electric circuit containing said electric prime mover and governed by said over-and-under device in a manner to initiate said cycle of weight recording performance when said device indicates zero.

3. Weighing and batching apparatus including in combination, three factors contributing jointly to the counterbalancing of a common weighable load, said factors consisting respectively of the heavy pendulum of an automatic weighing scale, the lighter pendulum of an over-and-under balance indicating device, and a plurality of batcher beams, together with means at times to hold certain batcher beams out of counterbalancing relation to said load and at other times to let said certain beams one by one into counterbalancing relation to said load, and connections between said beams and pendulums so constructed and arranged that each of said batcher means repeatedly lowers said lighter pendulum without disturbing said heavy pendulum as said batcher beam is let into counterbalancing relation to said load.

4. Weighing and batching apparatus as defined in claim 3 in which the said connections between said beams and pendulums are further so constructed and arranged that successive increases in the said weighable load result in repeated lifting of the said lighter pendulum through the same portions of a common range of balance indicating movement accompanied by progressive lifting of the said heavy pendulum through an always increasing range of weight indicating movement.

5. In a system of load component batching and weighing apparatus, the combination of, a receiver of additive load components, mechanism constructed and connected automatically to counterbalance and indicate the total weight of said additive load components in said receiver, a plurality of batcher beams, a device operative to hold each of said beams at times operatively disassociated from said load receiver, means operative individually upon said devices to cause the latter to release a plurality of said beams respectively into additive simultaneous counterbalancing relation to said load receiver, an over-and-under indicating device including a true balance indicating element, and connections operatively coupling said load receiver said mechanism said beams and said device together in such manner that said element is repeatedly moved away from true balance indicating position without disturbing the total weight indicating position of said mechanism as different batcher beams are released into counterbalancing relation to said load.

6. In a system of load component batching and weighing apparatus, the combination defined in claim 5, in which the said mechanism includes a weight indicating pointer displayed in such positional relationship to the said true balance indicator that both said pointer and said indicator shall lie in the same field of vision and be readable together from a single point of view.

7. In a compound system of load weighing and load component batching apparatus, the combination with a floating lever, of a load receiver connected to the mean portion of said lever, an automatic counterbalancing and weight indicating mechanism connected to one end portion of said lever, a pendulum and operatively associated over-and-under indicator connected to an opposite end of said lever, at least one batcher beam and means to throw said batcher beam individually into and out of draft relation to said opposite end of said lever.

8. Weighing apparatus comprising a plurality of bins each having a delivery opening, an electrically operable delivery gate for each delivery opening, a weigh hopper having a discharge opening, an electrically operable discharge gate for said discharge opening, an over-and-under balance indicating device connected to said hopper having a zero index, a batcher beam for predetermining respectively what weight of material delivered to said hopper from each of said bins will balance said over-and-under device at zero, an electrically releasable lock for holding each batcher beam out of operative relation to said over-and-under device, an electrically operable resetting mechanism for displacing said batcher beams from their said operative relation into the control of said locks, and electric circuits operatively relating the discharge gate, the resetting mechanism, delivery gates and locks so that energizing of certain circuits opens a delivery gate and releases a lock while the subsequent energizing of certain circuits opens said discharge gate and displaces one or more batcher beams from operative relation to said over-and-under device into the control of its lock.

9. Weighing apparatus comprising a weigh hopper having a discharge opening, an electrically operable gate for said opening, an over-and-under balance indicating device connected to said hopper having a zero index, a batcher beam for predetermining what weight of material delivered to said hopper will balance said over-and-under device at zero, an electrically operable resetting mechanism for displacing said batcher beam from operative relation to said over-and-under device, a common electric circuit having sections thereof connected to relate said gate and said resetting mechanism operatively, and means responsive to said device and thereby rendered operative to energize said common circuit in a manner to open said gate and simultaneously displace said batcher beam from operative relation to said over-and-under device.

10. In an electrically operated system of load weighing apparatus, in combination, an automatic load weight recording unit having an electrically started prime mover and including mechanism operative automatically to carry through and terminate a cycle of weight recording action, an electric switch electrically connected to energize and deenergize said prime mover and mechanically arranged to be opened by said mechanism, electrically controlled means to close said switch, a circuit containing said means for electrically energizing the latter from a remote point, a retarded relay in said circuit operative to deenergize said means automatically at a predetermined time after said means is energized and before said cycle of weight recording action is completed, thereby to permit said switch to be opened by said mechanism at the end of said cycle of action, and devices responsive to the load whose weight is recorded by said unit, together with connections operatively relating said devices to said relay.

11. Weighing apparatus comprising a plurality of bins each having a delivery opening, an electrically operable gate for each delivery opening, a weigh hopper, an over-and-under balance indicating device connected to said hopper having a zero index, batcher beams for predetermining respectively what weight of material delivered to said hopper from each of said bins will balance said over-and-under device at zero, an electrically releasable lock for holding each batcher beam out of operative relation to said over-and-under device, separate electric circuits operatively relating different gates respectively with different locks, means shiftable to energize and deenergize said circuits in a manner to open different gates and release different corresponding locks on successive occasions thereby to deliver an automatically measurable weight of material from each bin to the weigh hopper, a sequence determining current distributor adapted to advance step-by-step in response to certain electrical impulses constructed and arranged to predetermine thereby the order in which said gates shall be opened and said locks released, and an impulse controller electrically related to said circuit energizing means thereby to cause said impulses to be imparted to said distributor in synchronism with changes in the energization of said circuits.

12. In a compound system of load weighing and load component batching apparatus, the combination of, a load receiver for holding weighable materials, means to deliver materials to said receiver, electrically controlled means to start and stop the delivering of materials to said receiver, weighing mechanism constructed and connected automatically to counterbalance at least a portion of the weight of said receiver and to move through progressive positions responsive to increases of said weight, an electrically operable weight recording device including weight designating characters operatively associated with said automatic counterbalancing mechanism in a manner to be set for recording in respective accordance with said positions of said mechanism, electrically controlled means shiftable to and away from a position to initiate the recording of said weighing mechanism position by said device, a batcher beam shiftable to and from a range of operative movement in which said beam participates in the counterbalancing of the weight of said receiver, and electrically controlled means to cause said beam to shift to and away from its said range of operative movement.

13. In a compound system of load weighing and load component batching apparatus, the combination of, a load receiver for holding weighable materials, means to deliver load materials to said receiver, electrically controlled means to start and stop the delivering of materials to said receiver, weighing mechanism constructed and connected automatically to counterbalance at least a portion of the weight of said receiver and to move through progressive positions responsive to increases of said weight, an electrically operable weight recording device including weight designating characters operatively associated with said automatic counterbalancing mechanism in a manner to be set for recording in respective accordance with said positions of said mechanism, electrically controlled means shiftable to and away from a position to initiate the recording of said weighing mechanism position by said device, a batcher beam shiftable to and from a range of operative movement in which said beam participates in the counterbalancing of the weight of said receiver, electrically controlled means to cause said beam to shift to and away from its said range of operative movement, and means to discharge load materials from said receiver, together with an electrically advanceable circuit selector switch connected to prevent operation of said means to discharge materials until said means to initiate recording has been shifted to and away from its said position.

14. In a compound system of load weighing and load component batching apparatus, the combination defined in claim 12, together with a system of electric circuits including a circuit for energizing each of the said electrically controlled means to start and stop material delivery and another circuit for separately energizing the said electrically controlled means to shift a batcher beam, and a step-by-step electrically responsive circuit selector connected electrically to limit and determine automatically the sequence in which said circuits can be energized.

15. In a compound system of load weighing and load component batching apparatus, the combination defined in claim 12, together with a system of electric circuits including a circuit for energizing each of the said electrically controlled means to start and stop material delivery and another circuit for separately energizing the said electrically controlled means to shift a batcher beam, a step-by-step electrically responsive circuit selector connected electrically to limit automatically the sequence in which said circuits can be energized, and a circuit controller electrically connected to cause the said device to perform a weight recording operation at each successive energizing of said circuits.

16. An electrical system for controlling weighing and batching apparatus including the combination with a weigh hopper, of a plurality of batcher beams, a sequence determining electrically operated circuit selector, a plurality of electrical delivery control units for governing the delivery of different weighable materials to said hopper, an electrical discharge control unit for governing the discharge of materials from said hopper, a plurality of release controlling electrical units for letting said batcher beams respectively into operation, a beam resetting electrical unit for throwing all of said beans out of operation, circuit connections enabling a different one of said delivery control units to be energized together with a different one of said release controlling units upon different occasions and in a definite order determined automatically by said sequence selector, and circuit connections enabling said discharge control unit to be energized together with said beam resetting unit upon a still different occasion determined automatically by said sequence selector.

17. An electrical system comprising in combination with material weighing, recording and batching apparatus of the character described, a solenoid operated remote control switch having multiple contacts, a manually operable pilot switch contained in a common circuit with the operating solenoid of said remote control switch, a series of material flow control electromagnets and batcher beam shifting electromagnets respectively contained in circuits connected to be individually energized through the contacts of said remote control switch, a retarded relay connected to be energized through the contacts of said remote control switch, a circuit selecting sequence determining step-by-step relay connected to be electrically motivated intermittently by said remote control switch and by said retarded relay and further connected to determine which of said electromagnets shall at a given time be energized by said remote control switch, and an electromagnet connected to start the action of the recording apparatus and further connected to be alternately energized and deenergized by said remote control switch and said retarded relay respectively.

18. In apparatus of the character described, in combination; a weigh hopper, means to deliver component batches of different materials into said hopper, automatic hopper counterbalancing and weight indicating apparatus to measure and register the weight of the first of said component batches of materials and the aggregates of said first batch with other batches of materials added thereto in said hopper, recording means including movable type characters mechanically associated with said weighing means and mechanism to strike an impression from said characters thereby to make a record of the weights measured and registered by said weighing means, means to discharge an aggregate of said batches from said hopper, a plurality of batcher beams operatively relatable to said hopper and to its said counterbalancing means in a manner to assist the latter to counterbalance said hopper, means to let said beams successively and additively into operative relationship to said hopper and to its said counterbalancing means, and a system of electrical controlling units successively responsive to each of said batcher beams and respectively operative upon the several said means arranged and electrically connected first to cause the delivery to said hopper of successive component batches of materials accompanied by automatic measuring and registering of the weight thereof, then to cause after each said delivery and measuring of weight a recording of the measured weight by said type characters and impression striking mechanism, and then to cause after the completion of all said weighing and recording operations the discharge from said hopper of all aggregate batches whose accumulations of weight have successively been measured and recorded.

OSWALD S. CARLISS.